United States Patent [19]

Heitner

[11] Patent Number: 5,338,522

[45] Date of Patent: *Aug. 16, 1994

[54] STABILIZATION OF AQUEOUS HYDROXYLAMINE SOLUTIONS

[75] Inventor: Howard I. Heitner, Stamford, Conn.

[73] Assignee: Cytec Technology Corp., Wilmington, Del.

[*] Notice: The portion of the term of this patent subsequent to Dec. 21, 2009, has been disclaimed.

[21] Appl. No.: 993,752

[22] Filed: Dec. 21, 1992

Related U.S. Application Data

[62] Division of Ser. No. 704,475, May 23, 1991, Pat. No. 5,227,146.

[51] Int. Cl.$^5$ ............................................. C01B 21/20
[52] U.S. Cl. ................................. 423/265; 423/387; 423/388
[58] Field of Search ............... 423/265, 275, 387, 388; 548/174, 187

[56] References Cited

U.S. PATENT DOCUMENTS

| 3,145,082 | 8/1964 | Rausch et al. | 423/275 |
| 3,480,391 | 11/1969 | Carlos | 423/387 |
| 3,544,270 | 12/1970 | Carlos | 423/265 |

*Primary Examiner*—Wayne Langel
*Attorney, Agent, or Firm*—Frank M. Van Riet

[57] ABSTRACT

Solutions of an hydroxylamine or an at least partially neutralized hydroxylamine salt are stabilized against decomposition by adding thereto a mercaptobenzothiazole, a mercaptothiazoline, a thiuram disulfide, thiourea or a mercaptoalkanol.

14 Claims, No Drawings

STABILIZATION OF AQUEOUS HYDROXYLAMINE SOLUTIONS

This is a divisional of co-pending application Ser. No. 07/704,475, filed May 23, 1991, U.S. Pat. No. 5,227,146.

BACKGROUND OF THE INVENTION

Solutions of hydroxylamine are inherently unstable, decomposing by internal oxidation-reduction to form ammonia and nitrogen or nitrogen oxides. The decomposition is accelerated by high pH and the presence of catalytic amounts of cations such as Fe(II), Ni(II), and Cu(II). Aqueous solutions thereof are commonly produced by at least the partial neutralization of the hydroxylamine salt, such as the hydrochloride or sulfate, with an alkali metal hydroxide or ammonia. These solutions are widely used in synthesis work, but the instability of the free hydroxylamine in these solutions limits its utility in cases where storage is necessary.

There have been a number of attempts reported to stabilize solutions of an hydroxylamine or an at least partially neutralized hydroxylamine salt in order to achieve a longer shelf life. Compounds that have been reported to be stabilizers for such solutions include various chelating agents such as the tetrasodium salt of ethylene diaminetetraacetic acid (U.S. Pat. No. 3,145,082); amide oximes (U.S. Pat. No. 3,480,391); hydroxamic acids (U.S. Pat. No. 3,480,392); hydroxyureas and hydroxythioureas (U.S. Pat. No. 3,544,270); hydroxylalkylidene diphosphonic acids (U.S. Pat. No. 3,647,449); vicinal polyhydroxyphenols (Japanese Patent No. 4878099); hydroxyquinolines (Japanese Patent No. 57/100908); 1,10-phenantholine (Japanese Patent No. 58/69841); dipyridyl compounds (Japanese Patent No. 58/69842); thiocarboxylic acids (Japanese Patent No. 58/69843); quinoline derivatives (Japanese Patent No. 58/69844); hydroxy substituted flavone (German Patent No. 33/43597); anthocyanins (U.S. Pat. No. 4,551,318); hydroxyl substituted flavan (German Patent No. 3343599); stannic acid (Japanese Patent No. 60/260541); hydroxy substituted anthraquinones (U.S. Pat. No. 4,576,804); 8-hydroxyquinalidines (U.S. Pat. No. 4,629,613); and 2,3-dihydrohexano-1,4-lactone (U.S. Pat. No. 4,634,584).

SUMMARY OF THE INVENTION

The present invention provides stabilized solutions of an hydroxylamine or an at least partially neutralized hydroxylamine salt which are stable over a prolonged period, minimizing the decomposition of hydroxylamine. This is achieved by the addition of small amounts of a mercaptothiazole, a mercaptothiazoline, a thiuram disulfide, thiourea or a mercaptoalkanol.

DESCRIPTION OF THE INVENTION INCLUDING PREFERRED EMBODIMENTS

The first class of additives of the present invention include compounds having the formula:

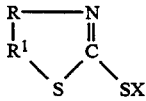

wherein R and $R^1$ are each $CHR^2$ groups or R and $R^1$ together form an aryl or cycloalkyl group, X is hydrogen or a monovalent cation, and each $R^2$ is, individually, hydrogen or an alkyl ($C_1$-$C_4$) group.

The 2-mercaptothiazoles useful in the present invention i.e. wherein R and $R^1$ above, form an aryl or cycloalkyl group are represented by the following formula:

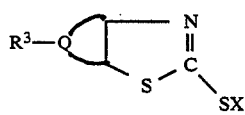

where $R^3$ represents a hydrogen atom or a lower hydrocarbon radical, X is as set forth above, and Q is aryl or cycloalkyl. Examples of suitable lower hydrocarbon radicals include $C_1$-$C_4$ alkyl, while such monovalent cations as sodium, potassium and ammonium are exemplary.

Exemplary compounds include 2-mercaptobenzothiazole; 2-mercaptocyclohexylthiazole; sodium 2-mercapto-4-methylbenzothiazole; potassium 2-mercapto-6-t-butyl-cyclohexylthiazole etc.

The 2-mercaptothiazolines useful in the present invention, as represented by Formula I, above, are;

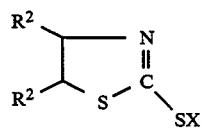

where $R^2$ and X are as set forth above.

Exemplary thiazolines include 2-mercapto-4,5-dimethylthiazoline; sodium 2-mercaptothiazoline; potassium 2-mercapto-5-t-butylthiazoline etc.

The second class of additives of the present invention include compounds having the formula:

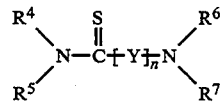

wherein $R^4$, $R^5$, $R^6$ and $R^7$ are, individually, hydrogen, a $C_1$-$C_{10}$ alkyl group or an aryl group, Y is a

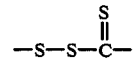

group and n is 0 or 1.

The thiuram disulfides useful in the present invention are those of Formula IV, above, where n is 1, and are represented by the formula:

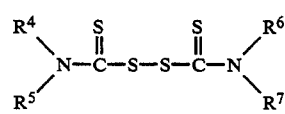

where $R^4$, $R^5$, $R^6$, and $R^7$ are as indicated above, most preferably hydrogen. When alkyl, $R^4$-$R^7$ are preferably $C_1$-$C_4$ alkyl radicals such as methyl, ethyl, n-butyl, t-butyl etc.

Tetramethylthiuram disulfide; tetra-n-butylthiuram disulfide; N,N'-diethylthiuram disulfide; tetraphenylthiuram disulfide; thiuramdisulfide and the like are representative compounds.

The thioureas of the present invention are those of Formula IV, above, where n is 0, and are represented by the formula:

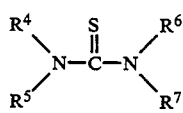

where $R^4$-$R^7$ are as indicated above, preferably hydrogen. Examples are thiourea, N,N'-diphenyl thiourea, diortho-tolyl thiourea, ethylene thiourea, and the like.

The third class of additives useful in the present invention are the mercaptoalkanols represented by the formula:

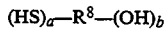

where $R^8$ represents a polyvalent alkylene radical containing 2 to 20 carbon atoms and a and b are integers of 1 to 3, the sum of a and b not exceeding 4. Examples of suitable compounds include 2-mercaptoethanol, 2-mercaptopropanol, 2,11-dimercapto-1,12-dodecanediol, and the like.

The amount of stabilizer to be used to stabilize the hydroxylamine or the at least partially neutralized hydroxylamine salt solution ranges from about 0,001 to about 100 mole %, based on the hydroxylamine salt. Preferably, the amount of stabilizer ranges from about 0.1 to about 10 mole %, same basis. The aqueous solutions of free hydroxylamine i.e. fully neutralized salt, can be produced by the reaction of a salt of hydroxylamine (such as the hydrochloride, the nitrate, the acetate, the sulfate salt etc.) with an alkali metal hydroxide (such as sodium hydroxide) or with ammonia. The concentration of the hydroxylamine or the at least partially neutralized hydroxylamine salt is usually at least about 1 weight percent of the aqueous solution and can range up to saturation or more, but is generally from about 3 to about 30, weight percent. It is best to add the stabilizer to the hydroxylamine salt solution before its neutralization with base, but the stabilizer can also be added to the at least partially hydroxylamine salt solution. The temperature during the stabilizer addition is advantageously kept at from about 5° C. to about 40° C. The stabilized solutions should be stored at temperatures <40° C., preferably <25° C.

The decomposition of the hydroxylamine in aqueous solutions is quite rapid at above pH 7.0 i.e. in the presence of excess base providing immediate evolution of the gaseous by-products. It is convenient to test the ability of a compound to stabilize the hydroxylamine solution by monitoring the amount of gas evolved with time. The stabilized solutions are useful in the preparation of hydroxamated polymers e.g. acrylamide polymers.

The following examples are set forth for purposes of illustration only and are not to be construed as limitations on the present invention except as set forth in the appended claims. All parts and percentages are by weight unless otherwise specified.

EXAMPLE 1

Comparative

A suitable reaction vessel is equipped with a thermometer, a pressure equalizing addition funnel, a stirring bar and a gas outlet which is connected to an inverted graduated cylinder filled with water. Into the vessel are charged 39.3 parts (0.144 mole) of 30% aqueous hydroxylamine sulfate solution. While maintaining the temperature below 25° C., 23.0 parts (0.288 mole) of 50% aqueous sodium hydroxide solution are added. The vessel is tightly sealed. Vigorous gas evolution is observed and the water is displaced from the graduated cylinder. 920 Ml of gas are evolved over a period of 4.5 hours. The gas is identified by its infrared absorption spectrum as being mainly nitrous oxide, indictating the decomposition of the hydroxylamine.

EXAMPLE 2

The procedure of Example 1 is repeated except that 1 mole percent of thiourea is added to the hydroxylamine sulfate solution before the addition of the sodium hydroxide. No measurable gas is collected in the cylinder after 16 hours indicating that the hydroxylamine is stabilized.

EXAMPLE 3

Using the same apparatus as in Example 1, 39.3 parts (0.144 mole) of 30% aqueous hydroxylamine sulfate solution are treated with 23.0 parts (0.288 mole) of 50% aqueous sodium hydroxide in the presence of 1 mole % of various stabilizer compounds and the gas evolution is monitored with time. The results are reported in Table I, below.

TABLE I

Hydroxylamine Stabilization Studies
Gas Collection Over Time

| Stabilizer Added | ml Gas | Time (Hr.) |
|---|---|---|
| None | 880 | 4.0 |
| None | 970 | 4.5 |
| 2-Mercaptobenzothiazole | 30 | 18.2 |
| 2-Mercaptobenezothiazole | 120 | 24.3 |
| Tetramethylthiuram Disulfide | 80 | 22.8 |
| Tetramethylthiuram Disulfide | 0 | 45.0 |
| 8-Quinolinol | 500 | 5.5 |
| 8-Quinolinol | 530 | 7.8 |
| 2-Mercaptothiazoline | 20 | 17.7 |
| 2-Mercaptothiazoline | 310 | 22.5 |
| 2-Mercaptothiazoline | 210 | 25.0 |
| 2-Mercaptothiazoline | 320 | 18.5 |
| 2-Mercaptothiazoline | 30 | 24.5 |
| 2-Mercaptothiazoline | 40 | 23.4 |
| 2-Mercaptobenzimidazole | 690 | 4.7 |
| 2-Mercaptobenzimidazole | 620 | 7.0 |
| 2-Mercaptobenzimidazole | 590 | 7.0 |
| Sodium Diethyl Dithiocarbamate | 600 | 18.2 |
| Thiourea | 0 | 24.0 |
| Sodium Diethyl Dithiophosphate | 220 | 23.0 |
| Sodium Diethyl Dithiophosphate | 670 | 71.0 |
| Sodium Diethyl Dithiophosphate | 560 | 4.0 |
| 2-Mercaptoethanol | 170 | 23.0 |
| Tolylbiguanide | 900 | 7.3 |
| Sodium Hydrosulfide | 890 | 6.5 |
| Sodium Hypophosphite | 850 | 21.0 |
| Sodium Metabisulfite | 870 | 5.0 |
| Hydroquinone | 690 | 23.0 |

EXAMPLES 4-12

Following the procedure of Example 2, various other stabilizers falling within the structural formulae I-VII, above, are employed in lieu of the thiourea. In each instance, gas evolution over 24 hours is reduced significantly when the stabilizer is added as compared to the hydroxylamine solution in the absence of stabilizer. The stabilizers are shown in Table II, below.

TABLE II

| Example | Formula No. | Q | R² | R³ | R⁴ | R⁵ | R⁶ | R⁷ | R⁸ | X | a | b |
| --- | --- | --- | --- | --- | --- | --- | --- | --- | --- | --- | --- | --- |
| 4 | II | benzyl | — | ethyl | — | — | — | — | — | K | — | — |
| 5 | II | cyclo- | — | t-butyl | — | — | — | — | — | Na | — | — |
| 6 | III | hexyl- | methyl | — | — | — | — | — | — | NH₄ | — | — |
| 7 | III | — | n-propyl | — | — | — | — | — | — | K | — | — |
| 8 | V | — | — | — | t-butyl | t-butyl | t-butyl | t-butyl | — | — | — | — |
| 9 | VI | — | — | — | phenyl | H | phenyl | H | — | — | — | — |
| 10 | VI | — | — | — | o-tolyl | H | o-tolyl | H | — | — | — | — |
| 11 | VII | — | — | — | — | — | — | — | propyl | — | 1(2) | 1 |
| 12 | VII | — | — | — | — | — | — | — | dodecyl | — | 2(2,11) | 2(1,12) |

We claim:

1. A stabilized solution containing an hydroxylamine or an at least partially neutralized hydroxylamine salt in water and an effective decomposition inhibiting amount of a compound selected from the group consisting of those having the formula:

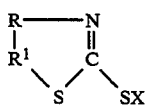
I wherein R and R¹ are each CHR² groups or together form a substituted or unsubstituted aryl or cylcoalkyl group, X is hydrogen or a monovalent cation and each R² group is, individually, a C₁–C₄ alkyl group or hydrogen; or

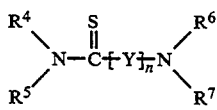
IV wherein R⁴, R⁵, R⁶ and R⁷ are individually, hydrogen a C₁–C₁₀ alkyl group or an aryl group, Y is a

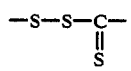

group and n is is 0 or 1; or (HS)ₐ—R⁸—(OH)_b    VII wherein R⁸ is a polvalent alkylene radical of 2–20 carbon atoms and a and b are integers of 1–3, inclusive, the sum of a and b not exceeding 4.

2. The stabilized solution of claim 1 wherein said compound is represented by the formula:

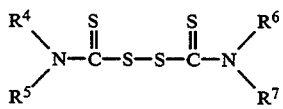
V where R⁴, R⁵, R⁶, and R⁷ are as set forth therein.

3. The hydroxylamine solution of claim 2 wherein R⁴, R⁵, R⁶, and R⁷ are methyl.

4. The stabilized solution of claim 1 wherein the compound is represented by the formula:

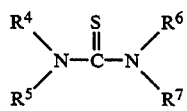
VI wherein R⁴–R⁷ are as designated therein.

5. The hydroxylamine solution of claim 4, wherein R⁴–R⁷ are hydrogen atoms.

6. The stabilized solution of claim 1 wherein said compound is represented by the formula:

(HS)ₐ—R⁸—(OH)_b    VII where R⁸, a and b are as represented therein.

7. The solution of claim 6, wherein the compound is 2-mercaptoethanol.

8. A process for inhibiting the decomposition of an hydroxylamine or an aqueous solution of at least a partially neutralized hydroxylamine salt which comprises adding to said solution a stabilizing amount of a compound having the formula:

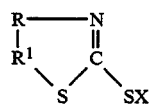
I wherein R and R¹ are each CHR² groups or together form a substituted or unsubstituted aryl or cycloalkyl group, X is hydrogen or a monovalent cation and each R² group is a C₁–C₄ alkyl group or hydrogen; or

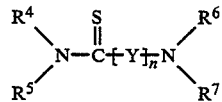
IV wherein R⁴, R⁵, R⁶ and R⁷ are, individually, hydrogen, a C₁–C₁₀ alkyl group or an aryl group, Y is a

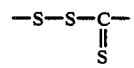

and n is is 0 or 1; or (HS)ₐ—R⁸—(OH)_b    VII wherein R⁸ is a polvalent alkylene radical of 2–20 carbon atoms and a and b are integers of 1–3, inclusive, the sum of a and b not exceeding 4.

9. A process according to claim 8 wherein said compound is represented by the formula:

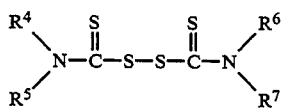

where $R^4$, $R^5$, $R^6$, and $R^7$ are as set forth therein.

10. The process of claim 9, wherein $R^4$, $R^5$, $R^6$ and $R^7$ are methyl.

11. A process according to claim 8 wherein said compound is represented by the formula:

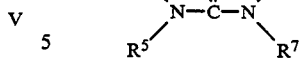

where $R^4$, $R^5$, $R^6$, and $R^7$ are as designated therein.

12. The process of claim 11 wherein $R^4$-$R^7$ are hydrogen atoms.

13. A process according to claim 8 wherein the compound is represented by the formula:

$$(HS)_a-R^8-(OH)_b \qquad \text{VII}$$

where $R^8$, a and b are as represented therein.

14. The process of claim 13 wherein the compound is 2-mercaptoethanol.

* * * * *

UNITED STATES PATENT AND TRADEMARK OFFICE
CERTIFICATE OF CORRECTION

PATENT NO. : 5,338,522
DATED : August 16, 1994
INVENTOR(S) : Howard L. Heitner

It is certified that error appears in the above-indentified patent and that said Letters Patent is hereby corrected as shown below:

"on the Title page under [*]Notice" should read:

-- The portion of the term of this patent subsequent to July 13, 2010, has been disclaimed. --

Signed and Sealed this

Eleventh Day of October, 1994

Attest:

BRUCE LEHMAN

*Attesting Officer*   *Commissioner of Patents and Trademarks*